(12) United States Patent
Kobayashi et al.

(10) Patent No.: US 7,438,005 B2
(45) Date of Patent: *Oct. 21, 2008

(54) LOW NOX COMBUSTION

(75) Inventors: Hisashi Kobayashi, Putnam Valley, NY (US); Lawrence E. Bool, III, Aurora, NY (US)

(73) Assignee: Praxair Technology, Inc., Danbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/803,135

(22) Filed: May 11, 2007

(65) Prior Publication Data
US 2007/0215022 A1    Sep. 20, 2007

(51) Int. Cl.
*F23J 15/00*    (2006.01)
*F23L 9/00*    (2006.01)

(52) U.S. Cl. ........................... 110/345; 110/348

(58) Field of Classification Search ............... 110/238, 110/342, 345, 348; 431/187, 8, 10
See application file for complete search history.

(56) References Cited

U.S. PATENT DOCUMENTS

| | | | |
|---|---|---|---|
| 3,656,878 A | 4/1972 | Wright | |
| 3,820,320 A | 6/1974 | Schirmer et al. | |
| 3,826,079 A | 7/1974 | Quigg et al. | |
| 3,873,671 A | 3/1975 | Reed et al. | |
| 4,193,773 A | 3/1980 | Staudinger | |
| 4,329,932 A | 5/1982 | Takahashi et al. | |
| 4,343,606 A | 8/1982 | Blair et al. | |
| 4,388,062 A | 6/1983 | Bartok et al. | |
| 4,408,982 A | 10/1983 | Kobayashi et al. | |
| 4,427,362 A * | 1/1984 | Dykema | 431/4 |
| 4,488,866 A | 12/1984 | Schirmer et al. | |
| 4,495,874 A | 1/1985 | Greskovich et al. | |
| 4,515,095 A | 5/1985 | Greskovich | |
| 4,541,796 A | 9/1985 | Anderson | |
| 4,556,384 A | 12/1985 | Laurenceau et al. | |
| 4,591,331 A | 5/1986 | Moore | |
| 4,596,198 A | 6/1986 | Greskovich et al. | |
| 4,654,001 A | 3/1987 | LaRue | |
| 4,761,132 A * | 8/1988 | Khinkis | 431/10 |
| 4,797,087 A | 1/1989 | Gitman | |
| 4,863,371 A | 9/1989 | Ho | |
| 4,878,830 A | 11/1989 | Henderson | |
| 4,899,670 A | 2/1990 | Hansel | |
| 4,917,727 A | 4/1990 | Saito et al. | |

(Continued)

FOREIGN PATENT DOCUMENTS

DE    4142401 A1    6/1993

(Continued)

OTHER PUBLICATIONS

Bool et al., "Oxygen for NOx Control—A Step Change Technology?"; The Nineteenth Annual International Pittsburgh Coal Conference, Pittsburgh, PA, 2002.

(Continued)

*Primary Examiner*—Kenneth B Rinehart
(74) *Attorney, Agent, or Firm*—Donald T. Black

(57) ABSTRACT

Combustion of hydrocarbon liquids and solids is achieved with less formation of NOx by feeding a small amount of oxygen into the fuel stream.

43 Claims, 8 Drawing Sheets

U.S. PATENT DOCUMENTS

| | | | |
|---|---|---|---|
| 4,946,382 A | 8/1990 | Kobayashi et al. | |
| 4,957,050 A | 9/1990 | Ho | |
| 4,969,814 A | 11/1990 | He et al. | |
| 4,973,346 A | 11/1990 | Kobayashi | |
| 4,988,285 A | 1/1991 | Delano | |
| 5,000,102 A | 3/1991 | Ho | |
| 5,076,779 A | 12/1991 | Kobayashi | |
| 5,085,156 A | 2/1992 | Dykema | |
| 5,158,445 A | 10/1992 | Khinkhis | |
| 5,186,617 A | 2/1993 | Ho | |
| 5,195,450 A | 3/1993 | Marion | |
| 5,201,650 A | 4/1993 | Johnson | |
| 5,203,859 A | 4/1993 | Khinkis et al. | |
| 5,213,492 A | 5/1993 | Ho | |
| 5,242,296 A | 9/1993 | Tuson et al. | |
| 5,266,025 A | 11/1993 | Francis, Jr. et al. | |
| 5,291,841 A | 3/1994 | Dykema | |
| 5,308,239 A | 5/1994 | Bazarian et al. | |
| 5,387,100 A | 2/1995 | Kobayashi | |
| 5,411,394 A | 5/1995 | Beer et al. | |
| 5,413,476 A | 5/1995 | Baukal, Jr. et al. | |
| 5,431,559 A | 7/1995 | Taylor | |
| 5,439,373 A | 8/1995 | Anderson et al. | |
| 5,454,712 A | 10/1995 | Yap | |
| 5,580,237 A | 12/1996 | Leger | |
| 5,601,425 A | 2/1997 | Kobayashi et al. | |
| 5,609,662 A | 3/1997 | Kobayashi et al. | |
| 5,611,682 A | 3/1997 | Slavejkov et al. | |
| 5,611,683 A | 3/1997 | Baukal, Jr. et al. | |
| 5,697,306 A | 12/1997 | LaRue et al. | |
| 5,724,897 A | 3/1998 | Breen et al. | |
| 5,725,366 A | 3/1998 | Khinkhis et al. | |
| 5,755,818 A | 5/1998 | Tuson et al. | |
| 5,832,847 A | 11/1998 | Leisse et al. | |
| 5,857,846 A | 1/1999 | Sattelmayer et al. | |
| 5,871,343 A | 2/1999 | Baukal et al. | |
| 5,904,475 A | 5/1999 | Ding | |
| 5,924,858 A | 7/1999 | Tuson et al. | |
| 5,931,654 A | 8/1999 | Chamberland | |
| 5,937,770 A | 8/1999 | Kobayashi et al. | |
| 5,960,724 A | 10/1999 | Toqan et al. | |
| 6,007,326 A | 12/1999 | Ryan, III et al. | |
| 6,030,204 A | 2/2000 | Breen et al. | |
| 6,085,674 A | 7/2000 | Ashworth | |
| 6,090,182 A | 7/2000 | Riley | |
| 6,113,389 A | 9/2000 | Joshi et al. | |
| 6,164,221 A | 12/2000 | Facchiano et al. | |
| 6,171,100 B1 | 1/2001 | Joshi et al. | |
| 6,200,128 B1 * | 3/2001 | Kobayashi | 431/5 |
| 6,206,949 B1 | 3/2001 | Kobayashi et al. | |
| 6,217,681 B1 | 4/2001 | Bazarian et al. | |
| 6,244,200 B1 | 6/2001 | Rabovitser et al. | |
| 6,276,928 B1 | 8/2001 | Joshi et al. | |
| 6,289,851 B1 | 9/2001 | Rabovitser et al. | |
| 6,314,896 B1 | 11/2001 | Marin et al. | |
| 6,325,003 B1 | 12/2001 | Ashworth et al. | |
| 6,357,367 B1 | 3/2002 | Breen et al. | |
| 6,394,790 B1 | 5/2002 | Kobayashi et al. | |
| 6,398,546 B1 | 6/2002 | Kobayashi | |
| 6,409,499 B1 | 6/2002 | Feldermann | |
| 6,519,973 B1 | 2/2003 | Hoke, Jr. et al. | |
| 6,568,185 B1 | 5/2003 | Marin | |
| 6,619,041 B2 | 9/2003 | Marin | |
| 6,659,762 B2 | 12/2003 | Borders et al. | |

FOREIGN PATENT DOCUMENTS

| | | |
|---|---|---|
| EP | 0187441 A2 | 7/1986 |
| EP | 0653590 B1 | 5/1995 |
| WO | WO 02/055933 A1 | 7/2002 |

OTHER PUBLICATIONS

Bool et al.; "NOx Reduction From A 44 MW Wall-Fired Boiler Utilizing Oxygen Enhanced Combustion"; Clearwater Conference, Mar. 10, 2003.

Michelfelder, et al., "Transfert de chaleur et pollution", Revue Generale De Thermique, No. 196 (Apr. 1978), p. 324 (with translation).

Sarofim, et al., "Strategies for Controlling Nitrogen Oxide Emissions During Combustion of Nitrogen-Bearing Fuels", The American Institute of Chemical Engineers (1978), No. 175, vol. 74, pp. 67-92.

Timothy, et al., "Characteristics of Single Particle Coal Combustion", $19^{th}$ Symposium on Combustion, The Combustion Institute (1982), pp. 1123-1130.

"Oxygen Enriched Air/Natural Gas Burner System Development", Final Report; Gas Research Institute, Jul. 1984-Sep. 1989 Chicago, Illinois; pp. 140 and 186-189.

Kobayashi, et al., "NOx Emission Characteristics of Industrial Burners and Control Methods Under Oxygen Enriched Combustion Conditions"; International Flame Research Foundation, 9th Members Conference, Noordwijkerhout (1989).

Baukal, et al., "Oxygen Enrichment Enhances Combustion", Air Products and Chemicals, Inc., (before 1992), pp. 17-23.

Panahi et al.; "Low NOx Technologies for Natural Gas-Fired Regenerative Glass Melters"; The Scandinavian Society of Glass Technology Annual Meeting, Oslo, Norway, 1992, pp. 1-15.

Baukal, et al., "$NO_x$ Measurements in Oxygen-Enriched, Air-Natural Gas Combustion Systems"; Air Products and Chemicals, Inc., 1990.

"Catalog of Technical Reports", Gas Research Institute (Dec. 1992).

Eddings, et al., "Advances in the Use of Computer Simulations for Evaluating Combustion Alternatives", presented at the $3^{rd}$ CREST International Symposium on High Temperature Air Combustion and Gasification, Yokohama, Japan (Mar. 2000).

Campbell, et al., "Oxy-coal Injection at Cleveland Ironworks", Ironmaking and Steelmaking (1992), vol. 19 No. 2, pp. 120-125.

Riley, et al., "Effect of Direct Oxygen Injection on Combustion of Injected Coal", Proc. $2^{nd}$ Internat. Cong. on the Sci. and Tech. of Ironmaking, ISS (1998), pp. 683-688.

Bose, et al., "Coal Composition Effects on Mechanisms Governing the Destruction of NO and Other Nitrogenous Species during Fuel-Rich Combustion", Energy & Fuels (1988), vol. 2, pp. 301-308.

Cremer, et al., "CFD Evaluation of Oxygen Enhanced Combustion: Impacts on NOx Emissions, Carbon-In-Flyash and Waterwall Corrosion" presented at Clearwater Conference, Mar. 10, 2003.

Bool, III et al., "Demonstration of Oxygen-Enhanced Combustion at the James River Power Station, Unit 3" presented at the Mega Symposium, Washington, D.C., May 20, 2003.

Farmayan, et al., "NOx and Carbon Emission Control in Coal-Water Slurry Combustion", Sixth International Symposium on Coal Slurry Combustion and Technology, Orlando, FL (1984).

Takano, et al., "$CO_2$ Recovery from PCF Power Plant with $O_2/CO_2$ Combustion Process", IHI Engineering Review, vol. 28, No. 4., pp. 180-184, Oct. 1995.

* cited by examiner

LOW NOX COMBUSTION

This invention was made with United States Government support under Cooperative Agreement No. DE-FC26-00NT40756 awarded by the Department of Energy. The United States Government has certain rights in the invention.

This application claims priority from U.S. Provisional Application Ser. No. 60/380,818 filed May 15, 2002, and U.S. nonprovisional application Ser. No. 10/436,164, filed May 13, 2003.

FIELD OF THE INVENTION

The present invention relates to combustion of hydrocarbon fuels containing bound nitrogen, particularly of coal.

BACKGROUND OF THE INVENTION

Environmental awareness is growing in the U.S. and around the world leading to increasing public and regulatory pressures to reduce pollutant emissions from boilers, incinerators, and furnaces. One pollutant of particular concern is NOx (by which is meant oxides of nitrogen such as but not limited to NO, $NO_2$, $NO_3$, $N_2O$, $N_2O_3$, $N_2O_4$, $N_3O_4$, and mixtures thereof), which has been implicated in acid rain, ground level ozone, and fine particulate formation.

A number of technologies are available to reduce NOx emissions. These technologies can be divided into two major classes, primary and secondary. Primary technologies minimize or prevent NOx formation in the combustion zone by controlling the combustion process. Secondary technologies use chemicals to reduce NOx formed in the combustion zone to molecular nitrogen. The current invention is a primary control technology.

In primary control technologies, different combustion strategies are used to control so called "thermal NOx" and "fuel NOx". Thermal NOx is formed by oxidation of nitrogen molecules, $N_2$, primarily in combustion air at high temperature. It is the main source of NOx emissions from natural gas and light oils that do not contain chemically bound nitrogen species. The main control strategy to reduce thermal NOx is to reduce peak flame temperature. Fuel NOx is formed by the oxidation of nitrogenous species contained in fuel and is the main source of NOx emissions from combustion of coal and heavy oil. The current invention relates to improved combustion methods to control fuel NOx emission.

The primary control technology for fuel NOx is commonly called staged combustion in which mixing between the combustion air and fuel is carefully controlled to minimize NOx formation. The formation of NOx from fuel nitrogen is based on a competition between the formation of NOx and the formation of $N_2$ from the nitrogenous species in the fuel volatiles and char nitrogen. Oxygen rich conditions drive the competition towards NOx formation. Fuel rich conditions drive the reactions to form $N_2$. Staged combustion takes advantage of this phenomenon by carefully controlling the mixing of air and fuel to form a fuel rich region to prevent NOx formation. To reduce NOx emissions, the fuel rich region must be hot enough to drive the NOx reduction kinetics. However, sufficient heat has to be transferred from the fuel rich first stage to the furnace heat load in order to prevent thermal NOx formation in the second stage.

A conventional low NOx burner (LNB) includes a fuel rich first zone, near the feed orifice, which is mainly controlled by mixing and combustion of fuel and primary air, and to some extent, additional secondary or tertiary air mixed in this zone. For combustion of pulverized coal the primary air is used to transport the coal particles.

In a second zone, the remainder of the secondary air and any tertiary air mix with the unburned fuel and products of partial combustion from the first stage and complete the combustion. An important process requirement for staged combustion is to transfer a sufficient amount of heat from the fuel rich first stage to the furnace heat load to cool down the combustion products from the first stage. Lower second stage temperature helps to reduce the conversion of remaining nitrogenous compounds to NOx and also to prevent thermal NOx formation in the second stage.

In an aerodynamically staged LNB, all of the combustion air is introduced from the same burner port or adjacent to the burner port. The most common configuration of a low NOx coal burner is to have a series of annular passages for coal/primary air, secondary air and tertiary air. The central passage is often used for oil gun or for natural gas for start up heating. Secondary and tertiary air flows are equipped with swirl generators to impart swirling flows to create a recirculation zone for flame stability. Air velocities and swirl are adjusted to create a relatively large fuel rich first zone along the axis of the burner, followed by relatively gradual mixing of secondary and tertiary air along the length of the furnace. Since sufficient air velocities must be provided to mix fuel and air within the furnace space to complete combustion, it is difficult to create a very large fuel rich zone to provide a long enough residence time for maximum NOx reduction.

Although the LNB is a fairly inexpensive way to reduce NOx and many advancements have been made in the burner design, currently available versions are not yet capable to reach the emissions limits in pending regulations of 0.15 lb (as $NO_2$) per MMBtu of coal fired for utility boilers.

Those skilled in the art have overcome the limitations of an aerodynamically staged LNB by a globally staged combustion arrangement using "over fire air" (OFA). OFA is injected separately from a burner or a group of burners to provide a large fuel rich primary combustion zone (PCZ) and a burnout zone (BOZ) where combustion is completed by mixing OFA and unburned fuel and the products of partial combustion from the PCZ. Typically the OFA ports are separated at least one burner port diameter from the closest burner and several burner port diameters from the furthermost burner. Although the fuel and air mixing and the local stoichiometric conditions near the burner port of an individual burner are similar to those without OFA, a large fuel rich PCZ is formed outside the combustion air mixing zone near the burner. Due to the physical separation of the OFA injection ports, the residence time in the fuel rich PCZ is much longer than that typically obtained in the fuel rich first zone of an aerodynamically staged burner. The combination of LNB's and OFA ports has enabled further reduction in NOx emissions.

Low NOx burners and over fire air represent a fairly mature technology and as such are discussed widely throughout the patent and archival literature. Many ideas have been proposed to enhance the effectiveness of LNB's and OFA while minimizing detrimental impacts such as poor flame stability and increased carbon in the ash. Of these ideas two are particularly relevant: preheating the air to the first stage, and converting the combustor to oxy-fuel firing.

Both air preheat and oxy-fuel combustion enhance the effectiveness of staged combustion for fuel NOx reduction by increasing the temperature in the primary combustion zone without increasing the stoichiometric ratio. Oxy-fuel combustion offers the additional advantage of longer residence times in the fuel rich region, due to lower gas flows, which has been shown to reduce NOx emissions. As discussed above, staged combustion uses a fuel rich stage to promote the formation of $N_2$ rather than NOx. Since the reactions to form $N_2$ are kinetically controlled, both the temperature and the hydrocarbon radical concentration are critical to reducing NOx formation. For example, if the temperature is high and the radical concentration is low, such as under unstaged or mildly staged conditions, NOx formation is increased. When the radical concentration is high but the temperature is low, such as under deeply staged conditions, the conversion of intermediate species such as HCN to $N_2$ is retarded. When air is added to complete burnout, the intermediates oxidize to form NOx, therefore the net NOx formation is increased.

Sarofim et al. "Strategies for Controlling Nitrogen Oxide Emissions During Combustion of Nitrogen bearing fuels", $69^{th}$ Annual Meeting of the AIChE, Chicago, Ill., November 1976, and others have suggested that the first stage kinetics can be enhanced by preheating the combustion air to fairly high temperatures. Alternately Kobayashi et al. ("NOx Emission Characteristics of Industrial Burners and Control Methods Under Oxygen-Enriched Combustion Conditions", International Flame Research Foundation $9^{th}$ Members' Conference, Noordwijkerhout, May 1989), suggested that using oxygen in place of air for combustion would also increase the kinetics. Oxy-fuel combustion, when flame temperature is controlled by burner design, further reduces thermal NOx formation by substantially eliminating $N_2$ in combustion air. In both cases the net result is that the gas temperature in the first stage is increased, resulting in reduced NOx formation. Further, using both air preheat and oxy-fuel firing allows the first stage to be more deeply staged without degrading the flame stability. This allows even further reductions in NOx formation.

Oxy-fuel firing offers a further advantage for LNB's. Timothy et al ("Characteristics of Single Particle Coal Combustion", $19^{th}$ Symposium (international) on Combustion, The Combustion Institute, 1983) showed that devolatilization times are significantly reduced, and the volatile yield is increased, when coal is burned in oxygen enriched conditions. These tests were single particle combustion tests performed under highly fuel lean conditions, which does not provide information on how much oxygen is needed to accomplish this under more realistic combustion conditions. The higher volatile yield means that the combustibles in the gas phase increase as compared to the baseline—leading to a more fuel rich gas phase which inhibits NOx formation from the volatile nitrogen species. In addition, the fuel volatiles ignite rapidly and anchor the flame to the burner, which has been shown to lower NOx formation. The enhanced volatile yield also leads to shorter burnout times since less char is remaining.

O. Marin, et. al., discuss the benefits of oxygen for coal combustion in a paper entitled "Oxygen Enrichment in Boiler" (2001 AFRC/JFRC/IEA Joint International Combustion Symposium, Kaui, Hi., Sep 9-13, 2001). They proposed injection of oxygen in the over fire air (also described as "tertiary air" in this paper), to reduce unburned carbon in ash, or Loss on Ignition (LOI), without increasing NOx emission. The computer simulation results reported by Marin, et al. compared the baseline air case and an oxygen enriched case with a high velocity, oxygen enriched stream in the tertiary air (also termed over-fire air). According to Marin, et. al., "An increase of 5% on heat transfer in the combustion chamber, combined with a 7% absolute increase in char burnout are noted." (page 8)

U.S. Pat. No. 4,495,874 discloses oxygen enrichment of primary and/or secondary air in pulverized coal fired burners in order to increase the steam rate of a boiler firing high ash pulverized coal. Example 4, in disclosing the effects of oxygen enrichment on NO emissions when burning high ash coal, says that oxygen added to the primary air or equally to primary or secondary air initially increased NO content at about 2% enrichment (which is defined there as 23% $O_2$ concentration of total air), but sharply decreased the amount of NO in the flue gas at the higher enrichments. For example, at 4 percent enrichment, NO was decreased by about 18-21 percent. However, there was no resulting NO decrease when oxygen was added only to the secondary air. In fact, there was an increase in NO concentration of about 12 percent.

Although the prior art describes several elegant enhancements for staged combustion and LNB's, several practical problems have limited their application. First, preheating the combustion air to the levels required to enhance the kinetics requires several modifications to both the system and the air piping. The air heater and economizer sections must be modified to allow the incoming air to be heated to higher temperatures, which may require modifications to the rest of the steam cycle components. The ductwork and windbox, as well as the burner itself, must also be modified to handle the hot air. All of the modifications can be costly and can have a negative impact on the operation of the boiler.

The primary barrier to the use of oxy-fuel firing in boilers has been the cost of oxygen. In order for the use of oxygen to be economic the fuel savings achieved by increasing the process efficiency must be greater than the cost of the supplied oxygen. For high temperature operations, such as furnaces without significant heat recovery, this is easily achieved. However, for more efficient operations, such as boilers, the fuel savings attainable by using oxy-fuel firing is typically much lower than the cost of oxygen. For example, if a typical coal-fired utility boiler were converted from air firing to oxygen firing, approximately 15 to 20% of the power output from that boiler would be required to produce the necessary oxygen. Clearly, this is uneconomic for most boilers.

Thus there remains a need for a method for achieving reduced NOx emissions in combustion of fuel (particularly coal) containing one or more nitrogenous compounds and especially for a method which can be carried out in existing furnaces without requiring extensive structural modifications.

BRIEF SUMMARY OF THE INVENTION

One aspect of the present invention, which can also be considered a method for retrofitting existing combustion devices, is a method that reduces the amount of NOx emitted comprising:

providing a combustion device that has a primary combustion zone and a burn out zone;

feeding air, and nonaqueous fuel that contains bound nitrogen and is selected from the group consisting of atomized hydrocarbon liquid and pulverulent hydrocarbon solids, through a burner into said primary combustion zone; and combusting the fuel in a flame in the primary combustion zone that has a fuel-rich zone, while feeding oxygen into said fuel by injecting it directly into said fuel in said primary combustion zone as said fuel emerges from said burner or by adding it to the air that is fed through said burner, so that the oxygen combusts with said fuel in said fuel-rich zone, in an amount of said oxygen which is less than 20% or even than 25% of the stoichiometric amount required for complete combustion of said fuel, and adjusting the amount of air fed through said burner so that the stoichiometric ratio in said primary combustion zone is between 0.6 and 0.99, and adding air into said burn out zone from a source other than said burner in an amount containing sufficient oxygen that the total amount of oxygen fed into said device is at least the stoichiometric amount needed for complete combustion of said fuel, and combusting residual combustibles from said primary combustion zone in said burn out zone. Preferably this stoichiometric ratio represents a variation of not more than 10% from the stoichiometric ratio in the primary combustion zone compared to the stoichiometric ratio without said addition of oxygen.

Another aspect of the present invention can be considered a method for operating a combustion device, whether retrofitted or constructed new embodying the features of this invention, wherein the method reduces the amount of NOx emitted, comprising:

providing a combustion device;

feeding air, and nonaqueous fuel that contains bound nitrogen and is selected from the group consisting of atomized hydrocarbon liquid and pulverulent hydrocarbon solids, through an aerodynamically staged burner into said device; and combusting said fuel in a flame that contains a fuel-rich zone, while feeding oxygen into said fuel by injecting it directly into said fuel in said fuel-rich zone as said fuel emerges from said burner or by adding it to the air that is fed through said burner, so that the oxygen combusts with said fuel in said fuel-rich zone, in an amount of said oxygen which is less than 20% or even than 25% of the stoichiometric amount required for complete combustion of said fuel, and adjusting the amount of air fed through said burner so that the stoichiometric ratio in said fuel rich zone is between 0.1 and 0.85, while maintaining or enlarging the size of said fuel-rich zone compared to its size when combustion is carried out in said combustion device without said oxygen feeding step but under otherwise identical conditions.

As used herein the term "stoichiometric ratio" when used in the context of an oxidant stream containing oxygen and a fuel stream smeans the ratio of oxygen in the oxidant stream and the fuel stream to the total amount of oxygen that would be necessary to convert fully all carbon, sulfur and hydrogen present in the substances comprising the fuel stream into carbon dioxide, sulfur dioxide and water.

As used herein, the term "fuel-rich" means having a stoichiometric ratio less than 1.0 and the term "fuel lean" means having a stoichiometric ratio greater than 1.0.

As used herein, the term "bound nitrogen" means nitrogen present in a molecule other than as $N_2$.

As used herein, "nonaqueous" means not suspended in, dissolved in, or dispersed in water, and not containing water, except that it does not exclude adsorbed water or water of hydration.

As used herein, the term "primary combustion zone" means the region within a combustion device immediately adjacent the burner outlets and which is mostly occupied by the flame or flames from the burner or burners.

As used herein, the term "burn out zone" means the region within a combustion device that is between the primary combustion zone and the flue, outside the flame or flames that are in the primary combustion zone, where overfire air is injected and the residual fuels and combustibles from the primary combustion zone are burned with overfire air.

As used herein, the term "primary combustion air" means air that has already been commingled with fuel as the fuel and this air are fed into a combustion device, e.g. through an orifice of a burner.

As used herein, the term "secondary combustion air" means air that is fed into a combustion device through one or more orifices of a burner, but which has not been commingled with fuel as this air is fed into the combustion device.

A burner that has orifices for secondary air may have additional orifices for feeding air which additional orifices are further from the point of entry of the fuel through the burner than are the orifices for the secondary air. As used herein, the term "tertiary combustion air" means air that is fed into a combustion device through such additional orifices. If a burner also has orifices positioned even further from the point of entry of the fuel than the orifices for the tertiary air, then air fed through such further orifices is termed herein "quaternary combustion air".

As used herein, the term "aerodynamically staged burner" means a burner in which all of the combustion air is introduced from the same burner port or adjacent to the burner port, and is capable of operating under conditions in which air velocities and flow patterns are present that create a relatively large fuel rich first zone along the axis of the burner, followed by relatively gradual mixing of secondary and tertiary air along the length of the furnace.

As used herein, the term "over fire air" (or "OFA") means air which is injected into a combustion device separately from the burner or burners in the combustion device to provide a large fuel rich primary combustion zone and a burnout zone where combustion is completed by mixing OFA with the unburned fuel and the products of partial combustion from the primary combustion zone.

References herein to feeding "oxygen", to the "oxygen" that is fed, and other references herein to the use of "oxygen" in an analogous context, mean gaseous streams that contain at least 35 vol. % $O_2$. Preferably, oxygen is provided as a gaseous stream containing at least 50 vol. % $O_2$, more preferably containing at least 80 vol. % $O_2$, and even more preferably containing at least 90 vol. % $O_2$. It should also be understood that references herein to combustion or reaction involving "oxygen" refer to $O_2$ itself.

DETAILED DESCRIPTION OF THE INVENTION

The invention will be described with reference to the Figures, although a description that refers to the Figures is not intended to limit the scope of that which is considered to be the present invention.

Figure 1:
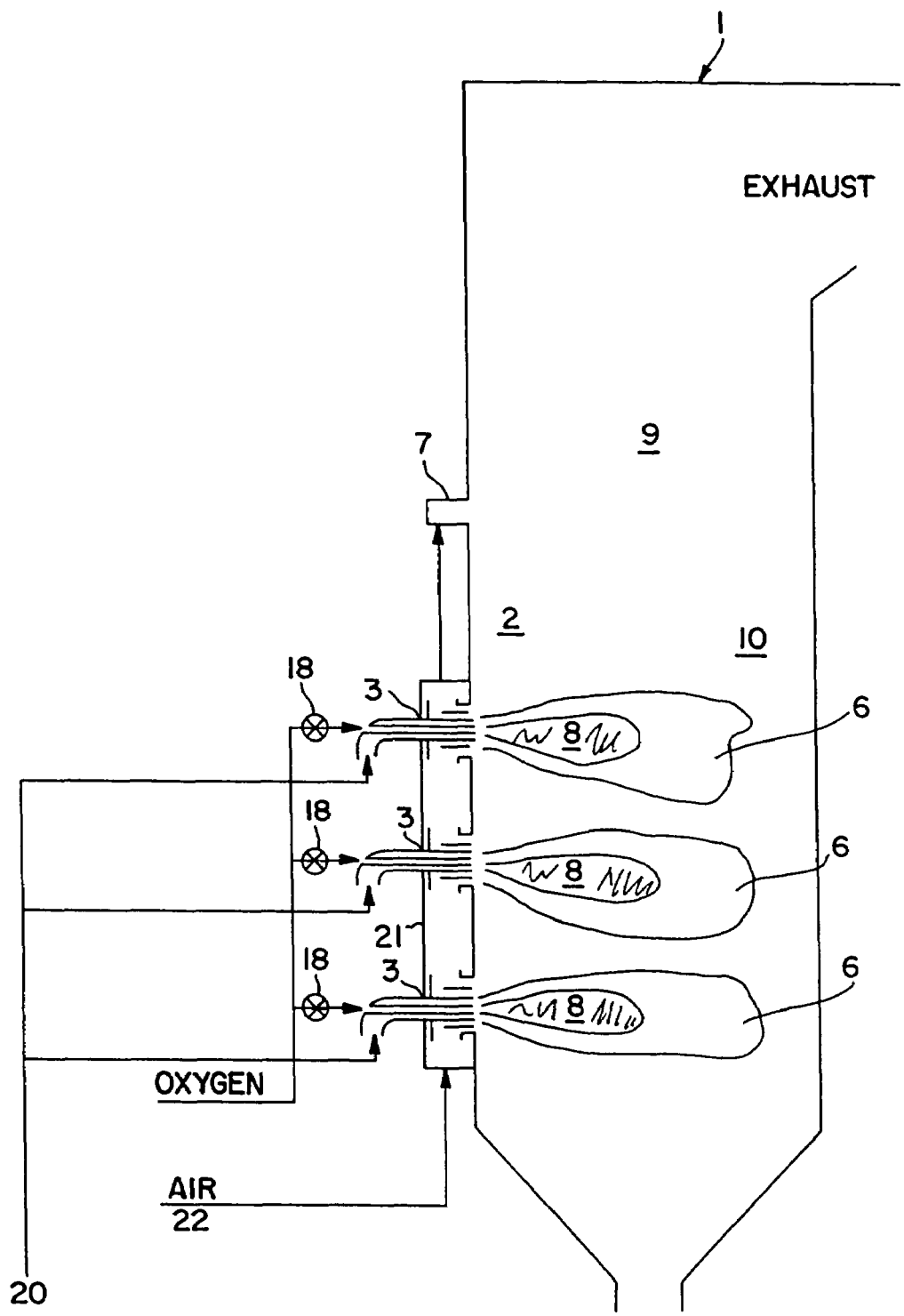
FIG. 1 is a cross-sectional representation of one embodiment of apparatus for carrying out the present invention.

FIG. 1 shows combustion device 1, which can be any apparatus wherein combustion is carried out in the interior 2 of the device. Preferred combustion devices include furnaces and boilers which are used to generate steam to generate electric power by conventional means, not shown.

Each burner 3 in a sidewall or end wall of combustion device 1 feeds fuel, air and oxygen from sources thereof outside the combustion device 1 into the interior 2 of combustion device 1. Suitable fuels include hydrocarbon liquids, such as fuel oil, and also include pulverulent hydrocarbon solids, a preferred example of which is pulverized coal or petroleum coke.

Figure 2:
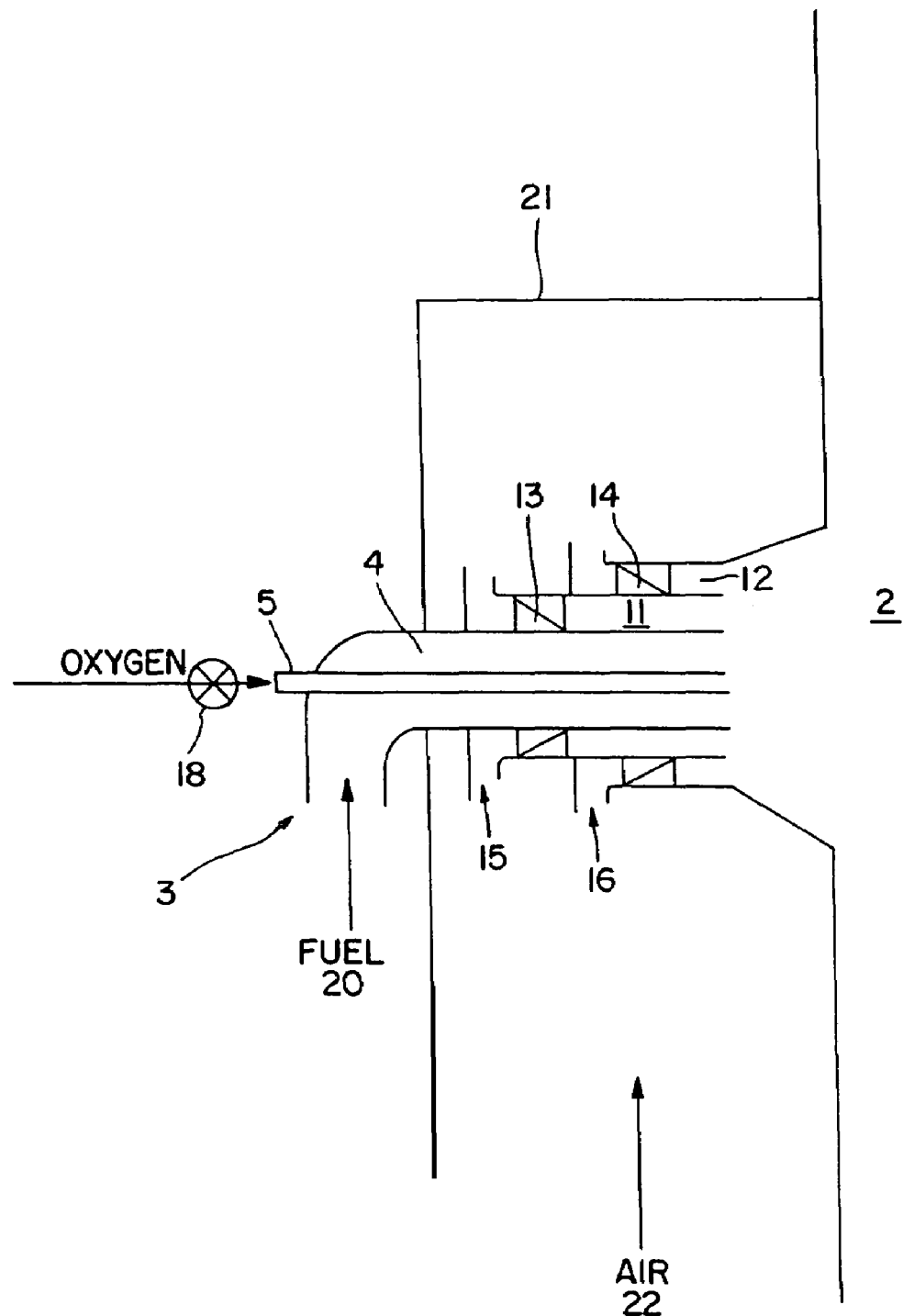
FIG. 2 is a cross-sectional representation of a burner useful for carrying out the present invention.

As seen in FIG. 1 and more closely in FIG. 2, burner 3 is preferably comprised of several concentrically arranged passages, although other constructions to the same effect can be used. The fuel is fed into combustion device 1 through annular passage 4, disposed concentrically around lance 5 through which oxygen is fed as described herein. Preferably, the fuel is transported from a supply source 20 to one or more burners 3 and propelled through burner 3 into the interior 2 of combustion device 1, by suitable pump means in the case of liquids such as fuel oil, and by blowers and impellers of conventional design in the case of hydrocarbon solids such as pulverized coal, which are conventionally fed into the combustion device with the aid of transport air (which is the primary combustion air). Liquid hydrocarbon fuels are preferably fed through one or more atomizing nozzles of conventional design, to feed the liquid fuel into the combustion chamber as discrete, dispersed droplets with atomizing air. An effective amount typically about 1.5 to 2.0 lb of primary air is used to transport 1 lb of coal, which corresponds to about 20% of the stoichiometric combustion air required for complete combustion of bituminous coal. For combustion of heavy oil about 0.5 to 1.0 lb of primary air is used to atomize 1 lb of oil.

Referring to FIG. 2, combustion air 22 is supplied by an FD fan to one or more windboxes 21 and fed to air passages of one or more burners 3. Secondary combustion air 15 is fed through burner 3 into combustion device 1, preferably through concentrically arranged annular passages 11 surrounding the annular space 4 through which the hydrocarbon fuel is fed. Preferably tertiary combustion air 16 is fed through burner 3 into combustion device 1, preferably through concentrically arranged annular passages 12 surrounding the secondary air passage. Preferably combustion air is also fed through over fire air port 7 (seen in FIG. 1) into combustion device 1. Preferably, the oxygen is fed into the interior 2 of the device apart from any secondary and tertiary combustion air. That is, the oxygen that is fed through burner 3 in accordance with this invention is preferably completely consumed in combustion with the fuel, before that oxygen has an opportunity to become commingled with secondary and tertiary combustion air before or immediately after it is fed into combustion device 1, especially when no over fire air is used. Alternatively, referring still to FIG. 2, the fuel could be fed through annular passage 4, and the oxygen fed through lance 5 surrounded by annular passage 4 or the oxygen could be fed through passage 11 surrounding annular passage 4.

Preferred low NOx burners have primary (fuel feeding), secondary and tertiary air passages for good aerodynamic adjustability. However, other low NOx burner designs using only primary and secondary air feeds can be used. Once the optimum settings with the three passages have been determined, the secondary air swirl vanes and passage can be designed to create about the same aerodynamic mixing characteristics as with the three-passage design. Alternatively, burners with an additional (quaternary) passage can be used (such as the RSFC™ burner described in U.S. Pat. No. 5,960,724).

Before a combustion device is retrofitted in accordance with the present invention to reduce the formation of NOx formed in the operation of the combustion device, lance 5 for feeding oxygen is not yet present. Combustion is carried out between the hydrocarbon fuel and the oxygen in the combustion air, resulting in formation of a flame 6. The region 8 of the flame closest to the end of burner 3, that is, where the hydrocarbon fuel emerges from the burner, is the fuel-rich zone. The area of the flame 6 around its periphery is relatively lean, as secondary and tertiary combustion air have not been fully mixed or reacted with fuel. When the amount of combustion air 22 to burner 3 is reduced and a sufficient amount of air is fed from over fire air port 7 for global combustion staging, the entire lower zone of the furnace, or primary combustion zone (PCZ) 10, below over fire air port 7 becomes fuel rich, except the areas near burners 3 where air is injected and not yet fully mixed or reacted with fuel.

Then, in the implementation of the present invention, lance 5 is added. Alternatively, a burner that feeds fuel and combustion air is replaced with a burner that performs as shown in the Figures.

Preferably, air is also fed through over fire air port opening 7 into the interior of combustion device 1, to make the primary combustion zone 10 less fuel lean or more fuel rich and to provide additional oxygen helping to achieve complete combustion of the fuel in the burnout zone 9. The oxygen in the combustion air fed through burner 3, combined with the oxygen contained in air fed at opening 7, if used, are sufficient to enable complete combustion of the fuel, and typically contain 10 to 25 volume percent excess oxygen over the amount required for the complete combustion of the fuel.

Preferably, the secondary and tertiary combustion air are fed at the burner 3 so as to swirl about a longitudinal axis, thereby creating a recirculation zone near each burner and improving commingling of air and fuel. Swirl can be achieved by known techniques, such as providing deflectors, 13 and 14, in the annular passages for secondary and tertiary air flow of the burner which direct the flow of the streams in the desired swirling direction. It is preferred to provide a high degree of swirl, preferably a swirl number, as defined in "Combustion Aerodynamics", J. M. Beer and N. A. Chigier, Robert E. Krieger Publishing Company, Inc., 1983, of 0.6 to 2.0.

In the practice of this invention with over fire air, it is preferred that the total amount of air fed through burner 3, i.e., the sum of primary, secondary and tertiary air, is between 60 and 99% of the stoichiometric air requirement for complete combustion. Most preferably the total amount of air fed through burner 3 into the primary combustion zone is about 70 to 85% of the stoichiometric air requirement for complete combustion.

The velocity of each stream of primary, secondary and tertiary combustion air is preferably 50 to 150 feet per second at the exit of the nozzle from which the air emerges. The velocity of the oxygen injected through lance 5, at the exit of the nozzle from which the oxygen emerges, is preferably within 10% to 900%, more preferably within 25% to 400% of the velocity of the primary air.

Tests have suggested that a preferred approach is to expose at least some of the fuel particles or droplets to a high concentration of oxygen as opposed to uniformly enriching the overall combustion air. The simple approach of injecting oxygen into the windbox 21 of a low NOx burner such that the enriched air is fed to the entire burner, including the critical primary stage air, is not considered as effective.

When pure oxygen is premixed or mixed rapidly into the coal transport stream (primary air stream) using 20% of stoichiometric air and the overall combustion stoichiometric ratio is kept constant at 1.15 by taking out the stoichiometrically equivalent amount of air from either secondary or tertiary air (*), the following average concentrations of oxygen in the transport air stream and in the overall combustion air are calculated, assuming the air is dry and contains 21% $O_2$.

| % of stoichiometric air replaced with $O_2$ (*) | $O_2$ concentration in transport air (vol. %) | Avg. $O_2$ concentration in total combustion air (vol. %) |
| --- | --- | --- |
| 0 | 21.0 | 21.0 |
| 5 | 24.9 | 21.7 |
| 10 | 28.5 | 22.5 |
| 15 | 31.7 | 23.4 |
| 20 | 34.7 | 24.3 |
| 25 | 37.4 | 25.4 |

(* e.g. 5 cf of air replaced with 1.05 cf of pure $O_2$ to give the same amount of $O_2$)

In this example, due to the small amount of oxygen used, only modest increases in the oxygen concentration of air are achieved when mixed uniformly even when oxygen is mixed only with the transport air. A preferred method is to inject oxygen into the coal/air transport stream at the tip of the nozzle of the lance. In this case some of the coal particles are mixed with oxygen jets and locally create zones of coal high $O_2$ mixture. Such conditions may provide zones of rapid ignition sources and facilitate early ignition and devolatilization as compared to the case oxygen is premixed with the transport air stream.

Another preferred method is to inject oxygen from the inner or outer annular space adjacent to the coal stream. In this case the favorable oxygen rich combustion condition is provided at the boundary of the coal and oxygen streams.

When oxygen is injected separately at high velocity parallel to the fuel stream, as was the case for Farmayan, et al., the oxygen jet(s) may be diluted quickly with surrounding gases and its effectiveness may be retarded. Thus, the method of oxygen injection has to be carefully designed.

The present invention improves, that is, lessens, the formation of NOx in the combustion device by feeding oxygen into the entering hydrocarbon fuel stream as described herein. More specifically and preferably, the oxygen is fed as a concentrated oxygen stream comprising preferably at least 50 vol. % $O_2$, more preferably at least 80 vol. % $O_2$, most preferably at least 90 vol. % $O_2$ and is fed directly into the hydrocarbon fuel as it emerges from the burner and enters the interior 2 of combustion device 1. Thus, at least some of the particles of solid fuel, or the droplets of liquid fuel, as the case may be, enter the combustion device and the fuel-rich zone of flame 6, in a gaseous atmosphere containing a high concentration of oxygen.

When over fire air is used for global combustion staging, preferably with air burners equipped with three or four separate air passages, oxygen may be premixed with the primary or secondary air or both, using suitable spargers within the gas passages in burner 3.

The oxygen is preferably fed through a lance 5 or similar feed line that can be open at the end that opens into combustion device 1, or that is closed at the end and has two or more openings in its periphery adjacent that closed end, such that oxygen flows out through those openings directly into the hydrocarbon fuel entering the combustion device from the burner.

Figure 7B:
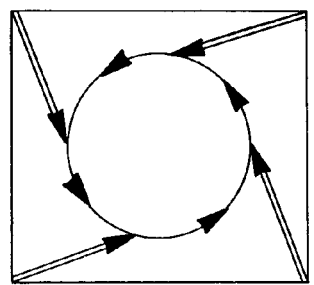
FIG. 7B is a top view of the furnace depicted in FIG. 7A, showing the tangential flow of fuel and oxidant into the furnace.
Figure 7A:
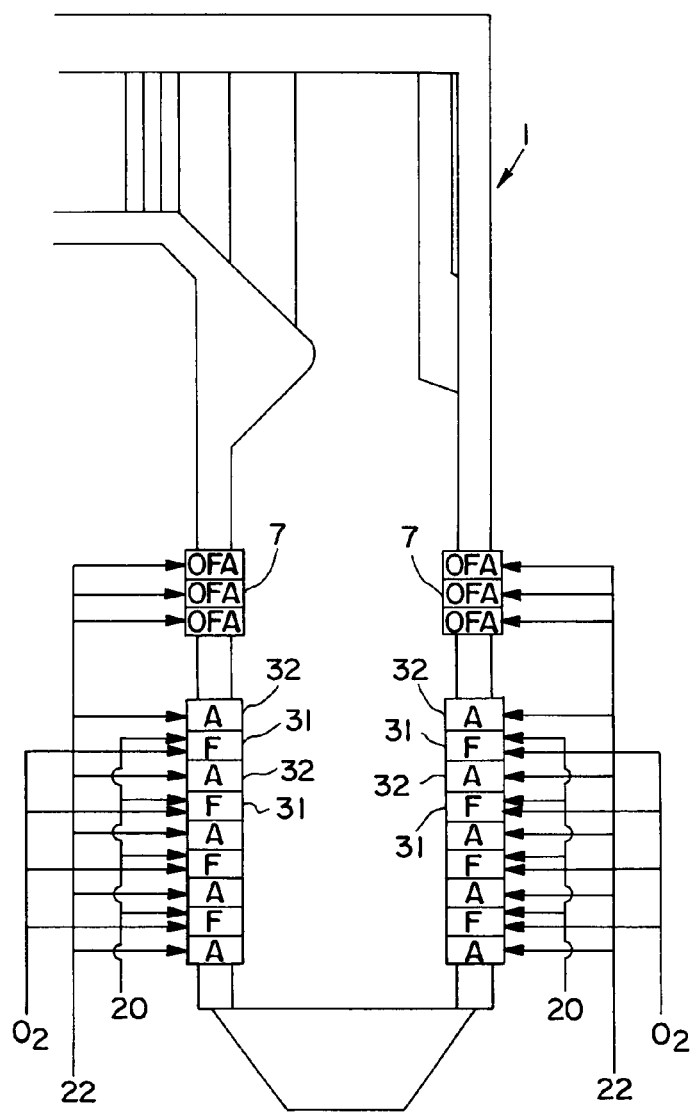
FIG. 7A is a cross-section view of another type of boiler furnace with which the present invention can be utilized, wherein fuel and oxidant are fed from separate ports tangentially into the furnace.
Figure 7C:
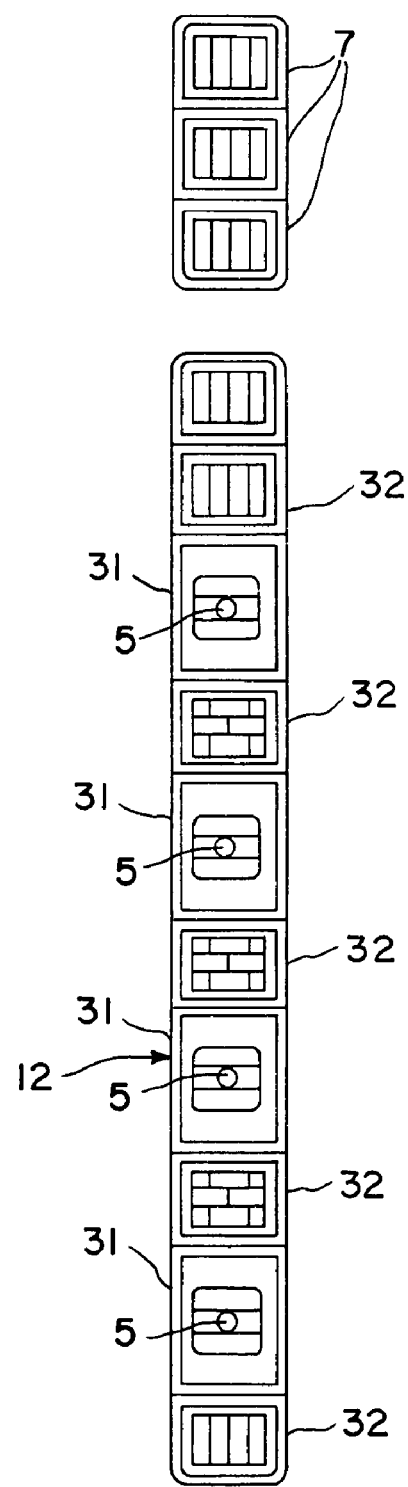
FIG. 7C is a front view from inside the furnace looking at the fronts of the ports.

Referring to FIGS. 7A and 7C, a tangentially fired furnace 1 comprises an array of ports for injecting fuel, and ports for injecting combustion air, into the furnace interior. Typically the fuel ports and the combustion air ports are arrayed in a vertical row, alternating with each other, as is illustrated in FIGS. 7A and 7C wherein ports 31 for injecting fuel alternate with ports 32 for injecting combustion air. The fuel combusts in the furnace interior with the combustion air. The furnace is also equipped with overfire air ports 7.

The present invention is readily adapted to furnaces having this type of construction, for instance by providing a lance 5 in one or more of the fuel ports and then feeding oxidant in the required amounts as taught herein into the fuel as it emerges from the burner. Oxygen lances 5 can also be placed in one or more of the combustion air ports or outside of the air and fuel ports, and oxygen is injected from the lance(s) toward the adjacent fuel stream.

Figure 3A:
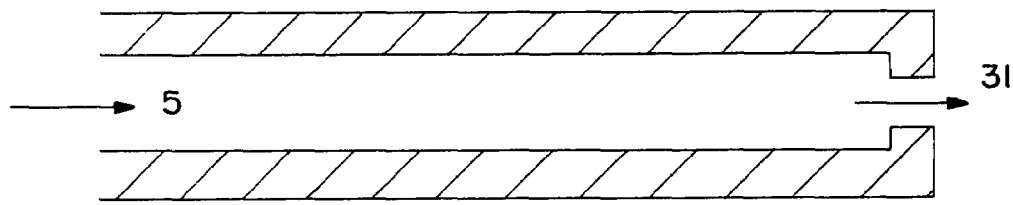
FIGS. 3a-3d are cross-sectional representations of lances useful for feeding oxygen into burners in accordance with the present invention.

FIGS. 3a through 3d show various lance configurations that can be employed. Other lance configurations can be used. In FIG. 3a, lance 5 ends with a single orifice 31 that is preferably oriented along the axis of the lance.

Figure 3B:
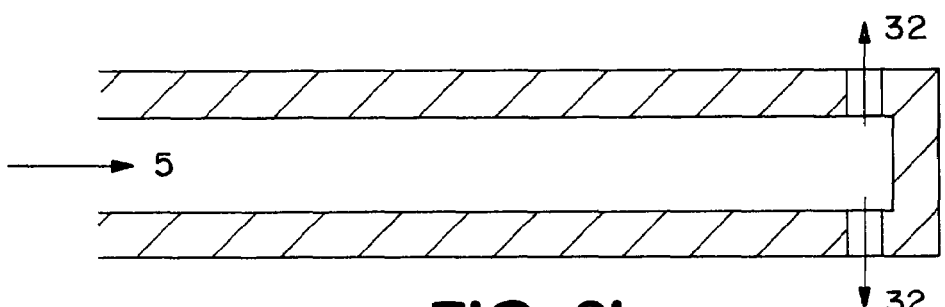

In FIG. 3b, the end of lance 5 is closed and two or more, preferably two to sixteen, more preferably four to eight nozzles 32 along the perimeter of the lance near the hot end of the lance are provided for radial oxygen injection. More than one row of radial nozzles can also be provided along the perimeter of the lance near the hot end. One to four or more nozzles can also be provided in the end of this lance.

Figure 3C:
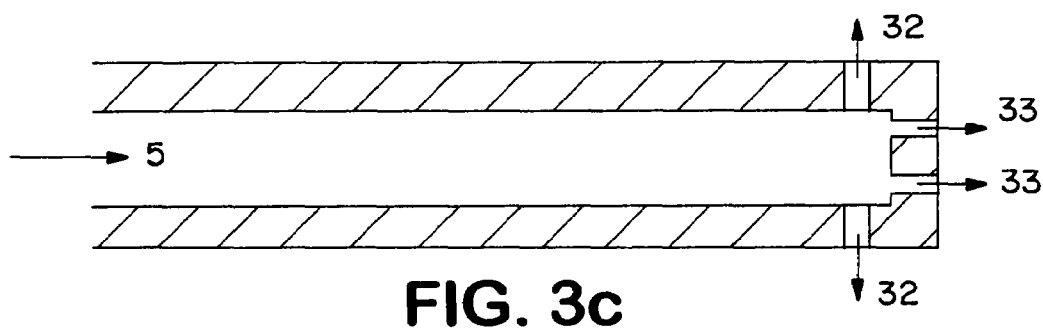

In FIG. 3c, two or more and preferably two to sixteen, more preferably four to eight nozzles 32 are provided radially near the closed downstream end of the lance 5, and two or more, preferably two to sixteen, preferably four to eight nozzles 33 are provided each of which forms an angle greater than 0 degrees and less than 90 degrees to the axis of the direction of flow of oxygen into the lance 5.

Figure 3D:
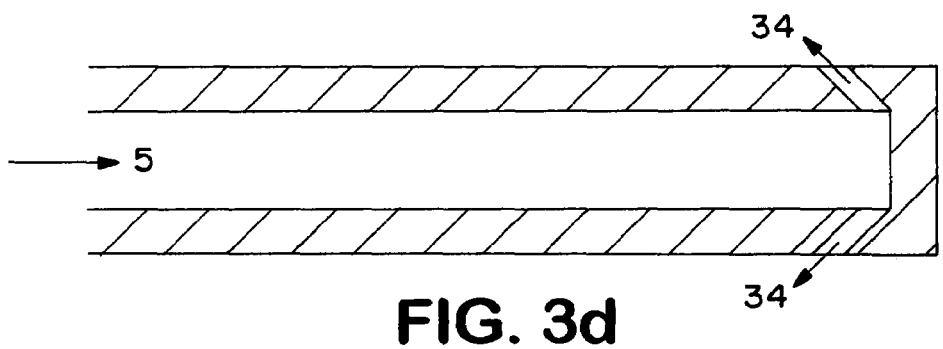

In FIG. 3d, two or more and preferably two to eight nozzles 34 are provided along the perimeter of the lance 5 near the hot end of lance 5, each of which forms an angle of 30 to 90 degrees, preferably an angle of 30 to 60 degrees, with respect to the reverse of the direction of flow of oxygen into the lance 5.

In these and other lance embodiments the nozzles through the side of the lance can be arrayed on one or more than one circumference.

The optimal angle of oxygen injection for NOx control depends on the tangential and radial momentum of the surrounding air, the burner port geometry and the nature of the burner airflow pattern near the oxygen lance. Accordingly, for better results in burners having low radial air momentum, the optimal angle is 90° or greater from the axis of the burner, whereas obtaining better results in burners having higher radial momentum will generally require the angle to be reduced to avoid mixing the oxygen with the air stream. With highly radial air flow the optimal angle is 15° or less (largely axial injection). For those burners that use techniques that create a strong air flow component in the radial direction, such as high swirl with a shallow diverging burner port or air deflectors, oxygen nozzles that are primarily angled in the axial direction (angle of less than 30° from the axis) are optimal. For burners in which the air flow is predominantly axial (that is, the radial component of the air flow is small or non-existent) it is preferred to inject the oxygen in the radial direction (angles between 45° and 135° from the axial flow component).

When oxygen is injected into combustion device 1 as described herein, the flow rate of combustion air fed through burner 3 is simultaneously reduced to maintain or reduce the primary combustion zone stoichiometric ratio. When overfire air is used, the primary combustion zone stoichiometric ratio with oxygen injection is preferably between 60 and 99%, more preferably between 60 to 85%, %, most preferably between 70 to 85%, of the stoichiometric air requirement for complete combustion. The amount of oxygen fed in this manner should be sufficient to establish a stoichiometric ratio in the fuel-rich zone 8 of flame 6 which is less than about 0.85 and is preferably much less than 0.85, e.g. 0.65 or less. The amount of oxygen fed through line 5 should be less than 20% of the stoichiometric amount required for the complete combustion of the fuel. Preferably, the amount corresponds to less than 15% of the stoichiometric amount required for complete combustion of the fuel. More preferably, the amount corresponds to less than 10% of the stoichiometric amount required for complete combustion of the fuel. Most preferably, the amount corresponds to less than 5% of the stoichiometric amount required for complete combustion of the fuel.

Contrary to the present invention, U.S. Pat. No. 4,495,874 discloses increased NO with 2% oxygen enrichment, which as defined in that patent is equivalent to about 13% of the stoichiometric amount required for complete combustion of the fuel. It also discloses sharply decreased NO at higher enrichments (4% enrichment, which as defined in that patent is equivalent to about 23% of the stoichiometric amount required for complete combustion of the fuel. The patent clearly does not anticipate the findings of the present invention that a small amount of oxygen, i.e., less than 20% of the stoichiometric amount required for the complete combustion of the fuel, can unexpectedly reduce NOx emissions when oxygen or oxygen enriched air is injected in the fuel rich zone of the primary combustion zone.

NOx emission strongly depends on the local stoichiometric conditions. As injection of oxygen makes the local stoichiometric condition leaner, one has to consider the change in the local stoichiometric conditions after the oxygen injection. For example, injection of oxygen, equivalent to 10% of the stoichiometric air, into a locally fuel rich zone at a stoichiometric ratio of 0.4 (SR=0.4), without changing the flow rate of combustion air being fed, would alter the local stoichiometric conditions to SR=0.5 and would be expected to decrease NOx emissions substantially. However, this is because SR=0.4 is too fuel rich for optimum NOx reduction. Such an effect is much greater than that from "replacing 10% air with oxygen" while keeping the local stoichiometric condition constant at SR=0.4. If the same amount of oxygen is injected into the fuel rich combustion zone, without changing the flow rate of the combustion air, where the local stoichiometric condition is SR=0.95, NOx emission is expected to increase sharply as the local stoichiometric condition is increased to SR=1.05.

Thus, it is generally preferred to inject oxygen into the richest area of the flame. In a combustion device using aerodynamically staged burners, the stoichiometric ratio in the fuel rich zone of the flame with oxygen injection is between 0.1 and 0.85, preferably between 0.4 and 0.75.

Injection or mixing of oxygen into the tertiary air and quaternary, if used, should be avoided in an aerodynamically staged burner without OFA. This is because tertiary and quaternary air is mixed in the relatively lean area of a flame. If the low Nox burner has only primary and secondary air, injection or mixing of oxygen into the secondary air should be avoided.

In theory the optimization of local stoichiometric condition can be done with any oxidants including air. However, oxygen is more effective because only a small volume is required and local stoichiometric condition can be changed without a large impact on the overall aerodynamic mixing conditions of the flame.

Another important requirement is that oxygen enrichment has to be done in such a way as to preserve or enhance the physical size of the fuel rich zone (the "$N_2$ forming zone") of an aerodynamically staged flame. The method of oxygen injection and the consequent reduction of air flows in certain air passages of a burner would influence the aerodynamic staging conditions of the burner, and hence the physical size and the local stoichiometric conditions. If the size of the fuel rich zone is reduced and the average gas residence time in the fuel rich zone is reduced as a result of oxygen injection, such a change could cause NOx increases. For example, high velocity injection of oxygen through an axial lance such as the one shown in FIG. 3a would effectively increase the axial momentum of the surrounding coal/air stream, which in turn may enhance the mixing with secondary and tertiary air. As a result the size of the fuel rich NOx reduction zone of the flame may be reduced and NOx may increase. On the other hand when the oxygen flow is injected radially from an axially located oxygen lance such as the one shown in FIG. 3b near the tip of the burner, it may effectively increase the recirculation zone near the burner and hence increase the size of the fuel rich zone and further promote NOx reduction by oxygen enrichment. Complex impacts of oxygen injection on the burner aerodynamic conditions have to be evaluated carefully for a specific burner to achieve NOx reduction.

Without intending to be bound by any particular explanation of the unexpected performance of this invention, the performance of the combustion device operated in accordance with this invention is consistent with a mechanism in which the injected oxygen causes an increase in the temperature of that portion of the flame closest to the burner, which in turn causes relatively volatile components present in the hydrocarbon fuel to enter the gas phase from the fuel and undergo partial reaction with the ambient oxygen, thereby creating a relatively reducing atmosphere that enables nitrogen-containing species released from the combusting fuel to be converted to molecular nitrogen, that is, $N_2$, rather that converted to NOx and other nitrogenous compounds such as HCN and $NH_3$.

Typically, the temperature of the fuel-rich zone into which the fuel and the oxygen enter is on the order of 2500° F. or higher. Feeding the oxygen in this manner can cause the base of flame 6 to draw nearer to the opening of burner 3, or even to become attached to burner 3. However, feeding the oxygen in the manner described herein into the hydrocarbon fuel as it emerges from the burner proceeds in the same manner, even if the flame becomes attached to the burner. In steady state operation, for instance after a combustion device has been retrofitted in accordance with the teachings herein, operation of the combustion device continues on the basis that less than 20%, preferably less than 15%, more preferably less than 10%, most preferably less than 5%, of the stoichiometric amount of oxygen required for the complete combustion of the fuel is fed into the fuel, while combustion air is fed through the burner in an amount less than otherwise would be the case, so that the total amount of oxygen fed into the device is at least the stoichiometric amount needed for complete combustion of the fuel.

Operation of a combustion device, fueled by hydrocarbon liquid fuel or pulverulent solid hydrocarbon fuel, in accordance with the teachings herein, has been found to produce surprising and significant reduction in the amount of NOx formed by combustion in the combustion device.

EXAMPLE 1

Figure 4:
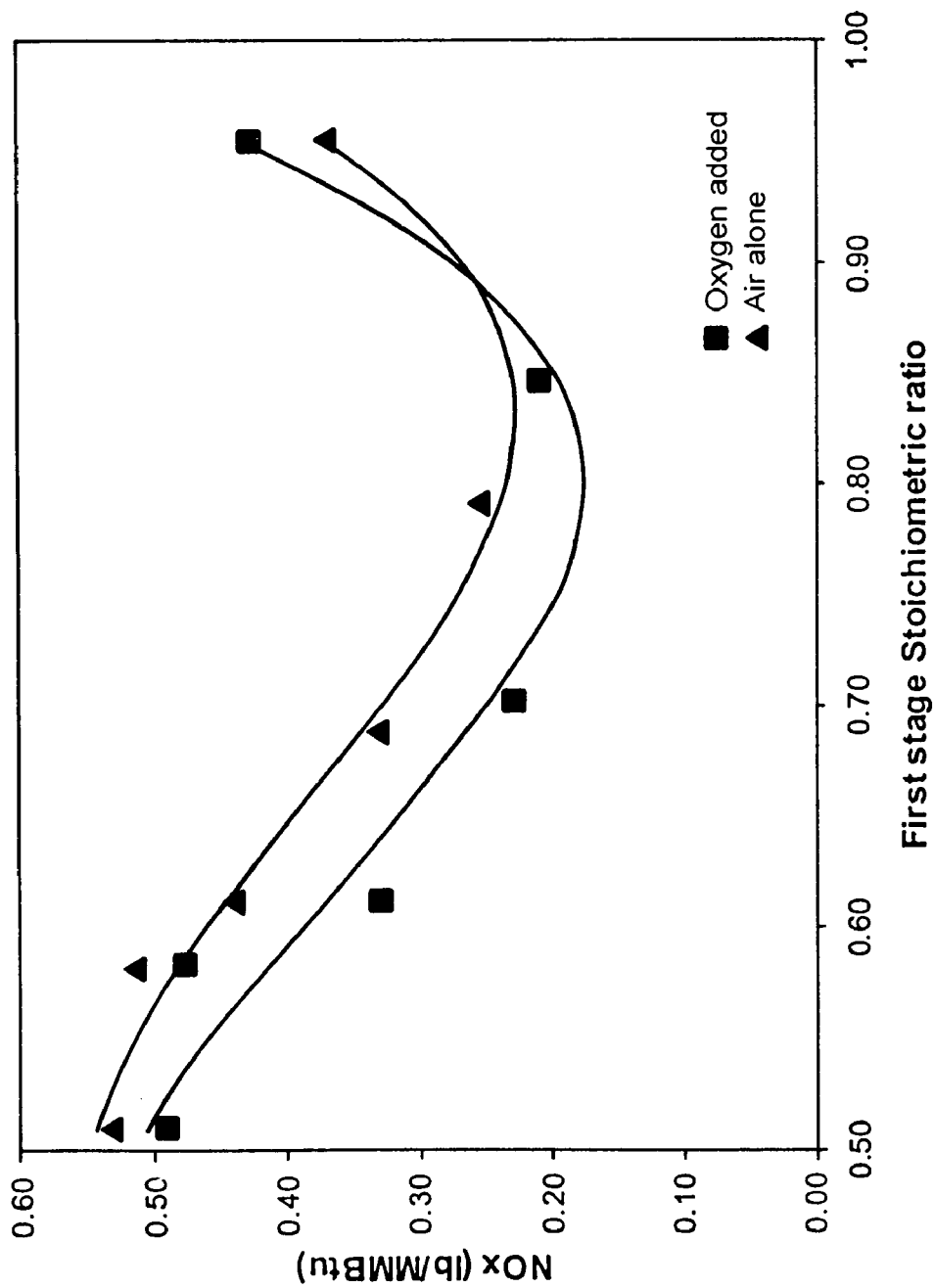
FIG. 4 is laboratory scale test results showing reduction of NOx emissions with the present invention.

Oxygen was mixed into the combustion air supplied to the first stage of a 17 kW thermal self-sustained downfired experimental furnace with 6" internal diameter. The oxygen enriched combustion air was fed to a premixed non-swirled pulverized coal-air burner. High volatile A bituminous coal (Illinois No. 6) was used. Oxygen was fed at a rate to replace 20% by volume of the combustion air, on an oxygen equivalent basis, supplied to the primary combustion zone (PCZ). This was equivalent to 10 to 20% of the stoichiometric air requirement. "Over fire air" was injected into the furnace approximately eight feet downstream of the burner face, which provided gas residence time of about 1 second in the PCZ. Sufficient over fire air was injected to keep the overall stoichiometric ratio at approximately 1.2. Although the temperature at the over fire air injection point varied according to the primary combustion zone stoichiometric ratio, it was held as constant between the air (baseline) and oxygen enriched cases. As can be seen from FIG. 4 addition of small amounts of oxygen reduced the emission of nitrogen oxides when the first stage was operated at below a stoichiometric ratio of about 0.9.

EXAMPLE 2

A low NOx coal-air burner was fired at about 4 MMBtu/hr in a refractory lined test furnace with internal dimensions of about 3.6 ft wide×3.6 ft high and 41 ft long. A pair of over fire air ports were located at about 10.5 ft from the burner exit. The burner is similar to one shown in FIG. 2 and consists of a central round passage and several annular passages for coal, air, oxygen and natural gas streams. The central passage was either used to insert an 1.9" OD and 1.5" ID oxygen lance or blocked to provide a bluff body to enhance gas recirculation for flame stability. Coal and primary air were injected from the first annular passage of 3.068" OD and 1.9" ID. The second annular passage (4.026" OD and 3.5" ID) was used to inject either natural gas or oxygen. The third (6.065" OD and 4.5" ID) and the fourth (7.981" OD and 6.625" ID) annular passages were used for secondary and tertiary air flows and were equipped with variable swirl generators to impart swirling flows. The burner is designed to provide an aerodynamically staged combustion condition. The axial velocities of the primary air and secondary air are similar to provide a slow mixing of the secondary air with the coal stream. The tertiary air has a significantly higher velocity than that of the secondary air. Thus, the secondary air provides a "buffer" for mixing between the tertiary air and the coal stream. A relatively large fuel rich combustion zone is created along the axis of the burner with relatively gradual mixing of secondary and tertiary air along the length of the furnace.

Figure 5:
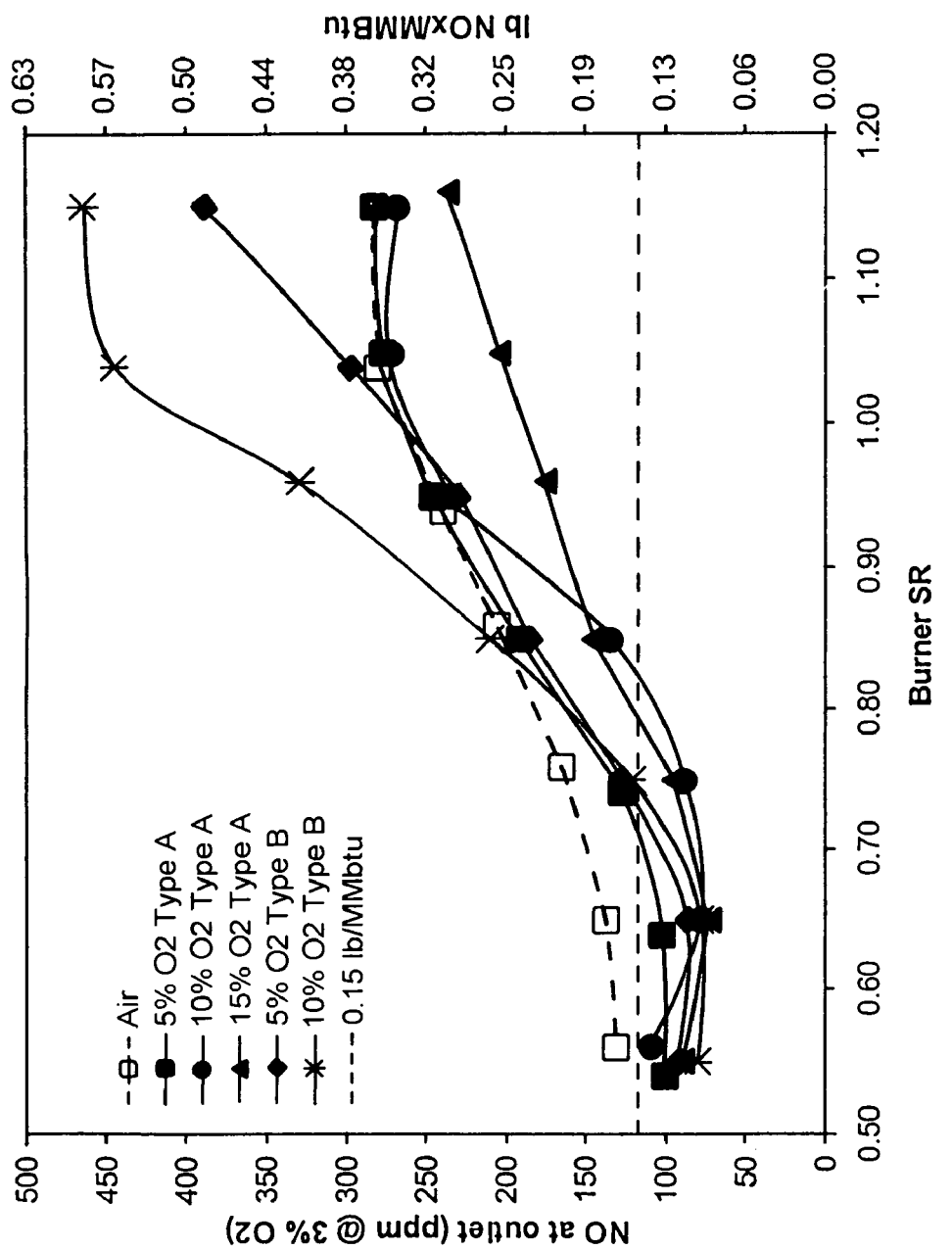
FIG. 5 is pilot scale low NOx burner test results showing reduction of NOx emissions with the present invention.

FIG. 5 shows the results of NOx emissions measured under different oxygen injection methods. Pure oxygen was injected through a cylindrical lance located in the axis of the burner. Different nozzle designs were used to inject oxygen and to mix with the adjacent annular coal stream. The amount of oxygen injected ranged from 5 to 15% of the stoichiometric oxygen. When oxygen was injected, the stoichiometrically equivalent amount of air was taken out of the secondary and tertiary air streams so as to maintain the same primary combustion zone and overall combustion stoichiometric ratio (fixed at SR=1.15). The primary air flow rate was kept constant at about SR=0.15. The over fire air for global combustion staging was injected perpendicular to the axis of the furnace from two directly opposed air nozzles.

Below a primary combustion zone SR (the stoichiometric ratio of the primary combustion zone) of about 0.80, significant NOx reduction, as compared with the air baseline, was obtained regardless of the type of oxygen nozzles used. At higher burner SR's NOx emissions were higher when a reverse angle nozzle, which has eight ¼ inch diameter holes as shown in FIG. 3.d (also referred to herein as a Type B nozzle) was used and about the same or lower with a nozzle of the type shown in FIG. 3.c, which has eight ¼ inch diameter radial holes and four ¼ inch diameter forward angles holes (also referred to herein as a Type A nozzle), depending on the amount of oxygen injected.

The observed results can be explained in terms of the changes caused by the oxygen injection in the aerodynamic staging conditions of the burner, i.e., the physical size of the fuel rich zone and the local stoichiometric conditions. When the primary combustion zone is deeply staged (SR less than 0.8), a large volume of the furnace space between the burner and the staging air injection point is maintained fuel rich. Although the injection of oxygen and reduction of secondary and tertiary air flows would change the local stoichiometric conditions near the burner (and either increase or decrease the volume of the fuel rich zone near the burner), the bulk of the primary combustion zone remains as fuel rich. The main effect of oxygen is to increase the temperature and accelerate the kinetics of NOx reduction in most of the primary combustion zone. Since the volume of the large fuel rich zone is little changed, significant NOx reduction is achieved relatively independent of the oxygen nozzle type.

As the amount of the over fire air is reduced, the size of the fuel rich zone is progressively reduced. At a burner SR=1.15, no staging air is used and the fuel rich zone is created solely by aerodynamic staging of the burner. The injection of oxygen would affect the mixing pattern of secondary and tertiary air flows with the coal stream and the size of the fuel rich zone could change significantly. If the size of the fuel rich zone is reduced and the average gas residence time in the fuel rich zone is reduced as a result of oxygen injection, such a change could cause NOx increases.

NOx emissions at SR=1.15, i.e., without staging air, were very sensitive to the $O_2$ nozzle types and the amount of oxygen used. CFD studies showed the following mixing conditions with a nozzle shown in FIG. 3b with eight ¼ inch radial holes. The radial oxygen jets penetrate into the annular coal stream for a short distance and mix rapidly with the surrounding coal stream. The annular coal stream partially flow in between the "fingers" of oxygen jets and partially expands radially. As a result, the diameter of the recirculation zone near the burner is increased, causing the size of the fuel rich zone to expand.

With a Type B $O_2$ nozzle the upstream angle of the oxygen jets is believed to have caused significant mixing of the primary coal stream and the tertiary, resulting in NOx increase. In general higher $O_2$ flow from radial or angled radial nozzles increases the oxygen jet velocity and causes more mixing. Thus, the size and angle of oxygen nozzles have to be carefully designed to rapidly mix oxygen into the coal stream, yet not to cause too much mixing between the tertiary air and the coal stream.

EXAMPLE 3

A commercial low NOx coal-air burner, the RSFC™ burner described in U.S. Pat. No. 5,960,724, was fired at about 24 MMBtu/hr in a refractory lined test furnace with internal dimensions of about 7.5 ft wide×7.5 high and 34 ft long. One or two opposed pairs of over fire air ports were located at about 26 feet from the burner exit. The burner consists of a central round passage and several annular passages for coal, air, oxygen streams. The central passage was used to insert an 1.9" OD and 1.5" ID oxygen lance. Coal and primary air were injected from the first annular passage. The second, third and the fourth annular passages were used for secondary, tertiary, and quaternary air flows and were equipped with variable swirl generators to impart swirling flows. The burner is designed to provide an aerodynamically staged combustion condition. A relatively large fuel rich combustion zone is created along the axis of the burner with relatively gradual mixing of tertiary and quaternary air along the length of the furnace.

Oxygen was injected through a round lance located in the axis of the burner. The nozzle design similar to the one shown in FIG. 3c, which has eight ⅜ inch diameter radial holes and four ⅜ inch diameter axially oriented holes was used to inject oxygen and to mix with the adjacent annular coal stream. The amount of oxygen injected ranged form 5 to 15% of the stoichiometric oxygen. When oxygen was injected, the stoichiometrically equivalent amount of air was taken out of the secondary, tertiary and quaternary air streams so as to maintain the same primary combustion zone (SR=0.75) and overall combustion stoichiometric ratio (SR=1.15). The primary air flow rate was kept constant at about SR=0.20. The over fire air for global combustion staging was injected perpendicular to the axis of the furnace from two to four directly opposed air ports.

Figure 6:
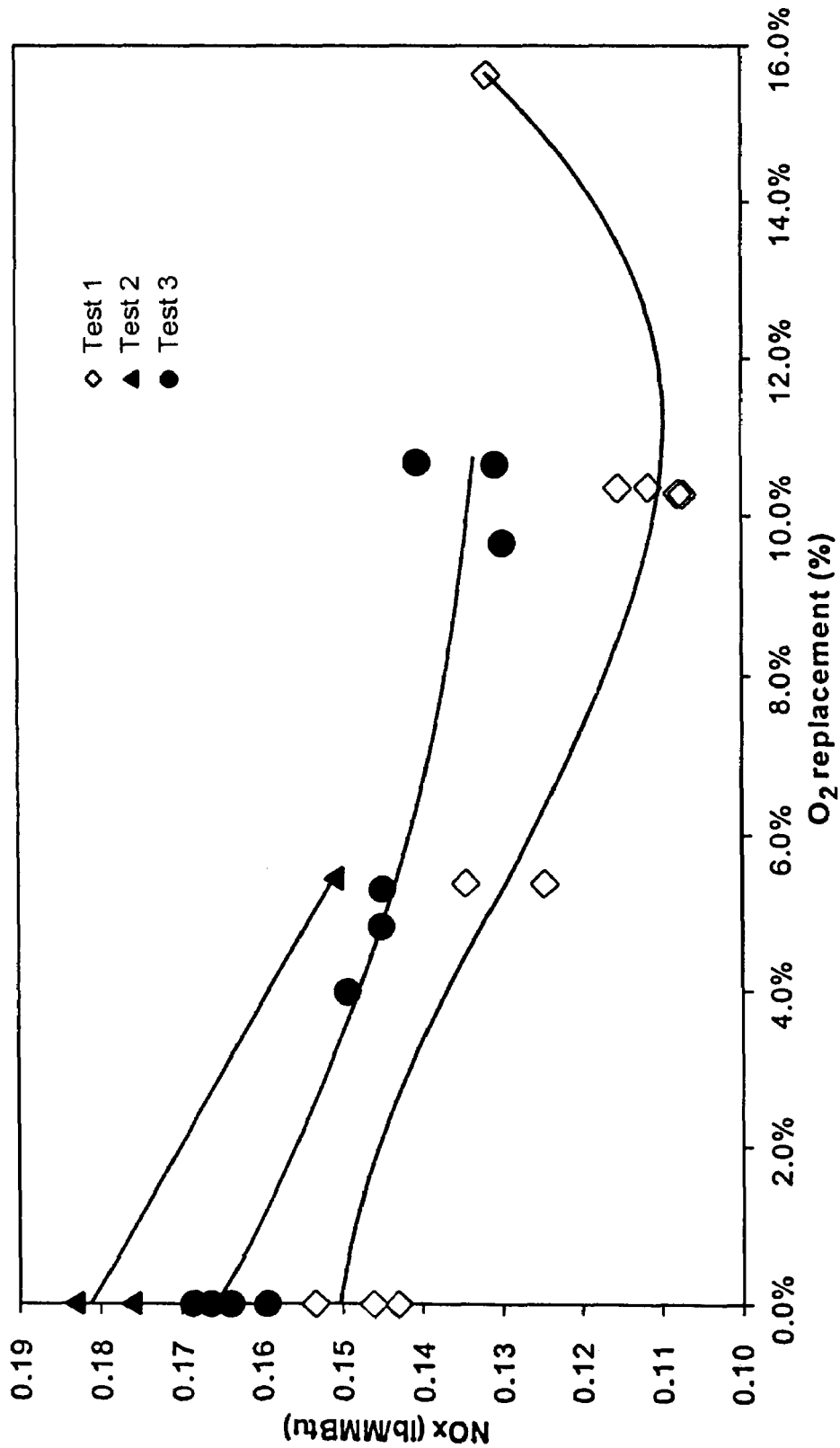
FIG. 6 is commercial scale low NOx burner test results showing reduction of NOx emissions with the present invention.

The settings of adjustable swirl vanes for secondary, tertiary, and quaternary air flows were optimized to give lowest NOx emissions for air only firing and the same settings were used when oxygen was injected. FIG. 6 shows the results of NOx emissions as a function of oxygen injection, measured under three different test periods. Although the baseline NOx emissions with air varied depending on test periods, significant NOx reductions were achieved by the present invention.

While the present invention has been described with principal reference to wall-fired boilers such as the type illustrated in FIGS. 1 and 2, this description is not intended to suggest that the invention is limited in applicability to that type of combustion system. The invention is applicable to other systems wherein fuel and air are combusted, including without limitation the tangentially-fired systems of the type described with respect to FIGS. 7A-7C, and combustion systems is known in the art as "cyclone" furnaces, wherein the primary combustion zone of the furnace includes one or more enclosures each having a cylindrical wall, a closed end wall, and an open end that opens into the main chamber of the furnace through a wall of the furnace, wherein fuel, combustion air and oxidant (fed in the amounts as taught herein into the fuel) are fed through the cylindrical wall and the end wall into the enclosure in a direction such that they rotate around the central axis of rotation of the enclosure and combust to form a flame and heat of combustion which are emitted through the open end into the main chamber of the furnace.

Other types of burners can be employed in addition to those exemplified herein, such as so-called split-stream burners wherein the stream of fuel is split into a plurality of streams separated from each other, and even diverging from each other, as the fuel enters the combustion chamber. With this type of burner, the oxygen is fed from a corresponding plurality of lances into each stream of fuel, or from a lance with a plurality of nozzles oriented toward each stream of fuel, and the stoichiometric requirements of oxygen are based on the total amounts of fuel and oxygen being fed.

What is claimed is:

1. A combustion method that reduces the amount of NOx emitted comprising:
   providing a combustion device that has a primary combustion zone and a burn out zone;
   feeding air, and nonaqueous fuel that contains bound nitrogen and comprises pulverized coal, through a burner into said primary combustion zone; and
   combusting the fuel in a flame in the primary combustion zone that has a fuel-rich zone, while
   feeding oxygen into said fuel by injecting it directly into said fuel in said primary combustion zone as said fuel emerges from said burner or by adding it to the air that is fed through said burner, so that the oxygen combusts with said fuel in said fuel-rich zone, in an amount of said oxygen which is less than 20% of the stoichiometric amount required for complete combustion of said fuel, and adjusting the amount of air fed through said burner so that the stoichiometric ratio in said primary combustion zone is between 0.6 and 0.99,
   and adding air into said burn out zone from a source other than said burner in an amount containing sufficient oxygen that the total amount of oxygen fed into said device is at least the stoichiometric amount needed for complete combustion of said fuel, and combusting residual combustibles from said primary combustion zone in said burn out zone.

2. A method according to claim 1 wherein a stream of said fuel is fed through said burner and oxygen is fed into said fuel by injecting it through a hollow lance, positioned in said stream, into the fuel as the fuel emerges from the burner.

3. A method according to claim 1 wherein a stream of said fuel is fed through an annular fuel passage of said burner, and oxygen is fed into said fuel by injecting it through an annular passage surrounding or surrounded by said annular fuel passage.

4. A method according to claim 1 wherein said oxygen is injected directly into said fuel through a lance having at least one orifice in the end of the lance, that is oriented along the axis of the lance.

5. A method according to claim 1 wherein said oxygen is injected directly into said fuel through a lance having a closed end and at least two nozzles along the perimeter of the lance near the end of the lance for radial oxygen injection.

6. A method according to claim 1 wherein said oxygen is injected directly into said fuel through a lance having a closed end, at least two nozzles provided radially near the closed end, and at least two nozzles each of which forms an angle greater than 0 degrees and less than 90 degrees to the axis of the direction of flow of oxygen into the lance.

7. A method according to claim 1 wherein said oxygen is injected directly into said fuel through a lance having a closed end and having at least two nozzles provided along the perimeter of the lance near the closed end of the lance, each of which forms an angle of 30 to 90 degrees with respect to the reverse of the direction of flow of oxygen into the lance.

8. A method according to claim 1 wherein said fuel is fed through said burner with air at a velocity of 50 to 150 feet per second, and oxygen is injected into said fuel at a velocity 25% to 400% of the velocity of said air.

9. A method according to claim 1 wherein any secondary and tertiary air fed through said burner has a swirl number of 0.6 to 2.0.

10. A method according to claim 1 wherein the stoichiometric ratio in said fuel rich zone is between 0.1 and 0.75.

11. A method according to claim 1 wherein the stoichiometric ratio in said primary combustion zone is between 0.7 and 0.85.

12. A method according to claim 1 wherein the amount of said oxygen fed into said fuel is less than 10% of the stoichiometric amount required for complete combustion of said fuel.

13. A method according to claim 1 wherein the amount of air fed through said burner is reduced by an amount containing sufficient oxygen that the primary combustion zone stoichiometric ratio varies by not more than 10% compared to the stoichiometric ratio without said addition of oxygen.

14. A method according to claim 1 wherein the air flow from said burner is predominantly axial and the oxygen is injected into said fuel at an angle of 45 to 135 degrees from the longitudinal axis of the burner.

15. A method according to claim 14 wherein said angle is at least 90 degrees from the longitudinal axis of the burner.

16. A method according to claim 1 wherein the air flow from said burner is predominantly radial and the oxygen is injected into said fuel at an angle of 15 degrees or less from the longitudinal axis of the burner.

17. A combustion method that reduces the amount of NOx emitted, comprising:
providing a combustion device;
feeding air, and nonaqueous fuel that contains bound nitrogen and comprises pulverized coal, through an aerodynamically staged burner into said device; and
combusting said fuel in a flame that contains a fuel-rich zone, while
feeding oxygen into said fuel by injecting it directly into said fuel in said fuel rich zone as said fuel emerges from said burner or by adding it to the air that is fed through said burner, so that the oxygen combusts with said fuel in said fuel-rich zone, in an amount of said oxygen which is less than 20% of the stoichiometric amount required for complete combustion of said fuel, and adjusting the amount of air fed through said burner so that the stoichiometric ratio in said fuel rich zone is between 0.1 and 0.85, while maintaining or enlarging the size of said fuel-rich zone compared to its size when combustion is carried out in said combustion device without said oxygen feeding step but under otherwise identical conditions.

18. A method according to claim 17 wherein the stoichiometric ratio in said fuel rich zone is between 0.4 and 0.75.

19. A combustion method that reduces the amount of NOx emitted, comprising:
providing a combustion device;
feeding air, and nonaqueous fuel that contains bound nitrogen and comprises pulverized coal, through an aerodynamically staged burner into said device; and
combusting said fuel in a flame that contains a fuel-rich zone, while
feeding oxygen into said fuel by injecting it directly into said fuel in said fuel rich zone as said fuel emerges from said burner or by adding it to the air that is fed through said burner, so that the oxygen combusts with said fuel in said fuel-rich zone, in an amount of said oxygen which is less than 20% of the stoichiometric amount required for complete combustion of said fuel, and adjusting the amount of air fed through said burner so that the stoichiometric ratio in said fuel rich zone is between 0.1 and 0.85, while maintaining or enlarging the size of said fuel-rich zone compared to its size when combustion is carried out in said combustion device without said oxygen feeding step but under otherwise identical conditions wherein a stream of fuel is fed through said burner and oxygen is fed into said fuel by injecting it through a hollow lance, positioned in said stream, into the fuel as the fuel emerges from the burner.

20. A method according to claim 19 wherein the stoichiometric ratio in said fuel rich zone is between 0.4 and 0.75.

21. A combustion method that reduces the amount of NOx emitted, comprising:
providing a combustion device;
feeding air, and nonaqueous fuel that contains bound nitrogen and comprises pulverized coal, through an aerodynamically staged burner into said device; and
combusting said fuel in a flame that contains a fuel-rich zone, while
feeding oxygen into said fuel by injecting it directly into said fuel in said fuel rich zone as said fuel emerges from said burner or by adding it to the air that is fed through said burner, so that the oxygen combusts with said fuel in said fuel-rich zone, in an amount of said oxygen which is less than 20% of the stoichiometric amount required for complete combustion of said fuel, and adjusting the amount of air fed through said burner so that the stoichiometric ratio in said fuel rich zone is between 0.1 and 0.85, while maintaining or enlarging the size of said fuel-rich zone compared to its size when combustion is carried out in said combustion device without said oxygen feeding step but under otherwise identical conditions wherein a stream of fuel is fed through an annular fuel passage of said burner, and oxygen is fed into said fuel by injecting it through an annular passage surrounding or surrounded by said annular fuel passage.

22. A method according to claim 21 wherein the stoichiometric ratio in said fuel rich zone is between 0.4 and 0.75.

23. A combustion method that reduces the amount of NOx emitted, comprising:
providing a combustion device;
feeding air, and nonaqueous fuel that contains bound nitrogen and comprises pulverized coal, through an aerodynamically staged burner into said device; and
combusting said fuel in a flame that contains a fuel-rich zone, while
feeding oxygen into said fuel by injecting it directly into said fuel in said fuel rich zone as said fuel emerges from said burner or by adding it to the air that is fed through said burner, so that the oxygen combusts with said fuel in said fuel-rich zone, in an amount of said oxygen which is less than 20% of the stoichiometric amount required for complete combustion of said fuel, and adjusting the amount of air fed through said burner so that the stoichiometric ratio in said fuel rich zone is between 0.1 and 0.85, while maintaining or enlarging the size of said fuel-rich zone compared to its size when combustion is carried out in said combustion device without said oxygen feeding step but under otherwise identical conditions wherein said oxygen is injected directly into said fuel through a lance having at least one orifice in the end of the lance, that is oriented along the axis of the lance.

24. A method according to claim 23 wherein the stoichiometric ratio in said fuel rich zone is between 0.4 and 0.75.

25. A combustion method that reduces the amount of NOx emitted, comprising:
providing a combustion device;
feeding air, and nonaqueous fuel that contains bound nitrogen and comprises pulverized coal, through an aerodynamically staged burner into said device; and
combusting said fuel in a flame that contains a fuel-rich zone, while feeding oxygen into said fuel by injecting it directly into said fuel in said fuel rich zone as said fuel emerges from said burner or by adding it to the air that is fed through said burner, so that the oxygen combusts with said fuel in said fuel-rich zone, in an amount of said oxygen which is less than 20% of the stoichiometric amount required for complete combustion of said fuel, and adjusting the amount of air fed through said burner so that the stoichiometric ratio in said fuel rich zone is between 0.1 and 0.85, while maintaining or enlarging the size of said fuel-rich zone compared to its size when combustion is carried out in said combustion device without said oxygen feeding step but under otherwise identical conditions wherein said oxygen is injected directly into said fuel through a lance having a closed end and at least two nozzles along the perimeter of the lance near the end of the lance for radial oxygen injection.

26. A method according to claim 25 wherein the stoichiometric ratio in said fuel rich zone is between 0.4 and 0.75.

27. A combustion method that reduces the amount of NOx emitted, comprising:
providing a combustion device;
feeding air, and nonaqueous fuel that contains bound nitrogen and comprises pulverized coal, through an aerodynamically staged burner into said device; and
combusting said fuel in a flame that contains a fuel-rich zone, while
feeding oxygen into said fuel by injecting it directly into said fuel in said fuel rich zone as said fuel emerges from said burner or by adding it to the air that is fed through said burner, so that the oxygen combusts with said fuel in said fuel-rich zone, in an amount of said oxygen which is less than 20% of the stoichiometric amount required for complete combustion of said fuel, and adjusting the amount of air fed through said burner so that the stoichiometric ratio in said fuel rich zone is between 0.1 and 0.85, while maintaining or enlarging the size of said fuel-rich zone compared to its size when combustion is carried out in said combustion device without said oxygen feeding step but under otherwise identical conditions wherein said oxygen is injected directly into said fuel through a lance having a closed end, at least two nozzles provided radially near the closed end, and at least two nozzles each of which forms an angle greater than 0 degrees and less than 90 degrees to the axis of the direction of flow of oxygen into the lance.

28. A method according to claim 27 wherein the stoichiometric ratio in said fuel rich zone is between 0.4 and 0.75.

29. A combustion method that reduces the amount of NOx emitted, comprising:
providing a combustion device;
feeding air, and nonaqueous fuel that contains bound nitrogen and comprises pulverized coal, through an aerodynamically staged burner into said device; and
combusting said fuel in a flame that contains a fuel-rich zone, while
feeding oxygen into said fuel by injecting it directly into said fuel in said fuel rich zone as said fuel emerges from said burner or by adding it to the air that is fed through said burner, so that the oxygen combusts with said fuel in said fuel-rich zone, in an amount of said oxygen which is less than 20% of the stoichiometric amount required for complete combustion of said fuel, and adjusting the amount of air fed through said burner so that the stoichiometric ratio in said fuel rich zone is between 0.1 and 0.85, while maintaining or enlarging the size of said fuel-rich zone compared to its size when combustion is carried out in said combustion device without said oxygen feeding step but under otherwise identical conditions wherein said oxygen is injected directly into said fuel through a lance having a closed end and having at least two nozzles provided along the perimeter of the lance near the closed end of the lance, each of which forms an angle of 30 to 90 degrees with respect to the reverse of the direction of flow of oxygen into the lance.

30. A method according to claim 29 wherein the stoichiometric ratio in said fuel rich zone is between 0.4 and 0.75.

31. A combustion method that reduces the amount of NOx emitted, comprising:
providing a combustion device;
feeding air, and nonaqueous fuel that contains bound nitrogen and comprises pulverized coal, through an aerodynamically staged burner into said device; and
combusting said fuel in a flame that contains a fuel-rich zone, while
feeding oxygen into said fuel by injecting it directly into said fuel in said fuel rich zone as said fuel emerges from said burner or by adding it to the air that is fed through said burner, so that the oxygen combusts with said fuel in said fuel-rich zone, in an amount of said oxygen which is less than 20% of the stoichiometric amount required for complete combustion of said fuel, and adjusting the amount of air fed through said burner so that the stoichiometric ratio in said fuel rich zone is between 0.1 and 0.85, while maintaining or enlarging the size of said fuel-rich zone compared to its size when combustion is carried out in said combustion device without said oxygen feeding step but under otherwise identical conditions wherein said fuel is fed through said burner with air at a velocity of 50 to 150 feet per second, and oxygen is injected into said fuel at a velocity 25% to 400% of the velocity of said air.

32. A method according to claim 31 wherein the stoichiometric ratio in said fuel rich zone is between 0.4 and 0.75.

33. A combustion method that reduces the amount of NOx emitted, comprising:
providing a combustion device;
feeding air, and nonaqueous fuel that contains bound nitrogen and comprises pulverized coal, through an aerodynamically staged burner into said device; and
combusting said fuel in a flame that contains a fuel-rich zone, while
feeding oxygen into said fuel by injecting it directly into said fuel in said fuel rich zone as said fuel emerges from said burner or by adding it to the air that is fed through said burner, so that the oxygen combusts with said fuel in said fuel-rich zone, in an amount of said oxygen which is less than 20% of the stoichiometric amount required for complete combustion of said fuel, and adjusting the amount of air fed through said burner so that the stoichiometric ratio in said fuel rich zone is between 0.1 and 0.85, while maintaining or enlarging the size of said fuel-rich zone compared to its size when combustion is carried out in said combustion device without said oxygen feeding step but under otherwise identical conditions wherein any secondary and tertiary air fed through said burner have a swirl number of 0.6 to 2.0.

34. A method according to claim 33 wherein the stoichiometric ratio in said fuel rich zone is between 0.4 and 0.75.

35. A combustion method that reduces the amount of NOx emitted, comprising:
   providing a combustion device;
   feeding air, and nonaqueous fuel that contains bound nitrogen and comprises pulverized coal, through an aerodynamically staged burner into said device; and
   combusting said fuel in a flame that contains a fuel-rich zone, while
   feeding oxygen into said fuel by injecting it directly into said fuel in said fuel rich zone as said fuel emerges from said burner or by adding it to the air that is fed through said burner, so that the oxygen combusts with said fuel in said fuel-rich zone, in an amount of said oxygen which is less than 20% of the stoichiometric amount required for complete combustion of said fuel, and adjusting the amount of air fed through said burner so that the stoichiometric ratio in said fuel rich zone is between 0.1 and 0.85, while maintaining or enlarging the size of said fuel-rich zone compared to its size when combustion is carried out in said combustion device without said oxygen feeding step but under otherwise identical conditions wherein the amount of said oxygen fed into said fuel is less than 10% of the stoichiometric amount required for complete combustion of said fuel.

36. A method according to claim 35 wherein the stoichiometric ratio in said fuel rich zone is between 0.4 and 0.75.

37. A combustion method that reduces the amount of NOx emitted, comprising:
   providing a combustion device;
   feeding air, and nonaqueous fuel that contains bound nitrogen and comprises pulverized coal, through an aerodynamically staged burner into said device; and
   combusting said fuel in a flame that contains a fuel-rich zone, while
   feeding oxygen into said fuel by injecting it directly into said fuel in said fuel rich zone as said fuel emerges from said burner or by adding it to the air that is fed through said burner, so that the oxygen combusts with said fuel in said fuel-rich zone, in an amount of said oxygen which is less than 20% of the stoichiometric amount required for complete combustion of said fuel, and adjusting the amount of air fed through said burner so that the stoichiometric ratio in said fuel rich zone is between 0.1 and 0.85, while maintaining or enlarging the size of said fuel-rich zone compared to its size when combustion is carried out in said combustion device without said oxygen feeding step but under otherwise identical conditions wherein the amount of air fed through said burner is reduced by an amount containing sufficient oxygen that the primary combustion zone stoichiometric ratio varies by not more than 10% compared to the stoichiometric ratio without said addition of oxygen.

38. A method according to claim 37 wherein the stoichiometric ratio in said fuel rich zone is between 0.4 and 0.75.

39. A combustion method that reduces the amount of NOx emitted, comprising:
   providing a combustion device;
   feeding air, and nonaqueous fuel that contains bound nitrogen and comprises pulverized coal, through an aerodynamically staged burner into said device; and
   combusting said fuel in a flame that contains a fuel-rich zone, while
   feeding oxygen into said fuel by injecting it directly into said fuel in said fuel rich zone as said fuel emerges from said burner or by adding it to the air that is fed through said burner, so that the oxygen combusts with said fuel in said fuel-rich zone, in an amount of said oxygen which is less than 20% of the stoichiometric amount required for complete combustion of said fuel, and adjusting the amount of air fed through said burner so that the stoichiometric ratio in said fuel rich zone is between 0.1 and 0.85, while maintaining or enlarging the size of said fuel-rich zone compared to its size when combustion is carried out in said combustion device without said oxygen feeding step but under otherwise identical conditions wherein the air flow from said burner is predominantly radial and the oxygen is injected into said fuel at an angle of 15 degrees or less from the longitudinal axis of the burner.

40. A method according to claim 39 wherein the stoichiometric ratio in said fuel rich zone is between 0.4 and 0.75.

41. A combustion method that reduces the amount of NOx emitted, comprising:
   providing a combustion device;
   feeding air, and nonaqueous fuel that contains bound nitrogen and comprises pulverized coal, through an aerodynamically staged burner into said device; and
   combusting said fuel in a flame that contains a fuel-rich zone, while
   feeding oxygen into said fuel by injecting it directly into said fuel in said fuel rich zone as said fuel emerges from said burner or by adding it to the air that is fed through said burner, so that the oxygen combusts with said fuel in said fuel-rich zone, in an amount of said oxygen which is less than 20% of the stoichiometric amount required for complete combustion of said fuel, and adjusting the amount of air fed through said burner so that the stoichiometric ratio in said fuel rich zone is between 0.1 and 0.85, while maintaining or enlarging the size of said fuel-rich zone compared to its size when combustion is carried out in said combustion device without said oxygen feeding step but under otherwise identical conditions wherein the air flow from said burner is predominantly axial and the oxygen is injected into said fuel at an angle of 45 to 135 degrees from the longitudinal axis of the burner.

42. A method according to claim 41 wherein said angle is at least 90 degrees from the longitudinal axis of the burner.

43. A method according to claim 41 wherein the stoichiometric ratio in said fuel rich zone is between 0.4 and 0.75.

* * * * *